Dec. 5, 1944.  A. N. GUSTAFSON  2,364,211
APPARATUS FOR INFLATING AND DEFLATING PONTONS OR THE LIKE
Filed April 30, 1943
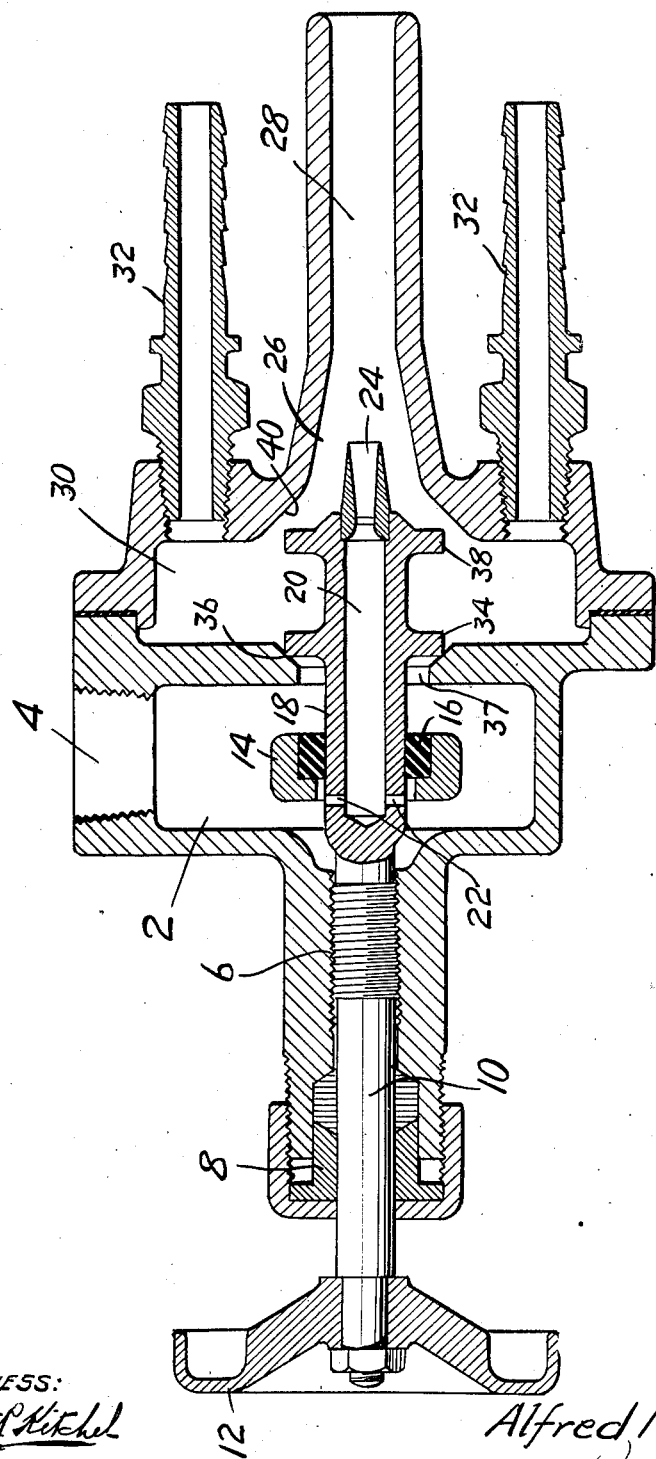
WITNESS:
INVENTOR
Alfred N. Gustafson
BY
ATTORNEYS.

Patented Dec. 5, 1944

2,364,211

UNITED STATES PATENT OFFICE 2,364,211

APPARATUS FOR INFLATING AND DEFLATING PONTONS OR THE LIKE

Alfred N. Gustafson, West Chester, Pa., assignor to Schramm, Inc., West Chester, Pa., a corporation of Pennsylvania Application April 30, 1943, Serial No. 485,211

1 Claim. (Cl. 230—95)

This invention relates to an apparatus for inflating and deflating pontons or the like.

Pontons formed of rubber or other air-tight flexible material are used largely in military operations for the carrying of bridge structures, transportation of troops and equipment, etc., and take the form of inflatable bags of various sizes, shapes and constructions which, when not in use, are deflated to a flat condition and may be formed into compact, easily transportable rolls. When inflated for use, they have a very high degree of buoyancy, with the result that they are able to sustain very heavy loads.

The inflation of such a ponton is generally accomplished very rapidly by the use of portable air compressors capable of delivering large volumes of air, the air being retained after inflation by check valves associated with the ponton openings. As contrasted with the rapidity of inflation of the pontons, their deflation is a matter of very considerable difficulty, since the available pressure tending to force the air out is essentially only that represented by the tendency of the ponton to collapse. As a consequence, if the air is exhausted directly to the atmosphere, it has been necessary to have men jump about on the ponton to force the air out of it, such deflation taking a considerable period of time, of the order, for example, of 10 to 15 minutes, as compared with a time of, say, 2 minutes, for complete inflation. Even following such efforts, there are generally left in the ponton air pockets which make it impossible to roll it up into as compact a unit as would result if the air was completely removed.

In order to avoid the difficulties just mentioned, it has been proposed to secure the deflation by connecting the ponton to the suction of the compressor, whereby the back pressure against which the deflating flow occurs may be reduced very considerably below atmospheric pressure. This system, however, is impractical by reason of the fact that a good air compressor has very close cylinder head clearances and there must be no possibility that any liquid or solid material may get into a cylinder. For this reason, it is necessary to provide an effective, and hence rather elaborate, filter for the purpose of insuring against the entrance of water, dirt, or other foreign material into the compressor, the presence of which liquid or foreign material is very likely to occur in the ponton due to leakage and condensation of moisture therein. Furthermore, this arrangement involves the difficulty of shifting connections from the discharge to the intake side of the compressor. Generally speaking, a single compressor must handle the lines to upwards of four separate ponton chambers, and the matter of making connections involves waste of substantial time and effort.

The broad object of the present invention is the provision of an apparatus whereby with a minimum of manipulation a ponton may be inflated and deflated with great rapidity and without the possibility of there entering the compressor any foreign material. While the apparatus is particularly designed for this purpose, it will be evident that it may be used for other purposes such as rapid inflation and deflation of balloons, rafts or the like, or for various technical applications where air or other gas must be successively forced into and rapidly removed from some chamber, in particular with avoidance of any possibility of foreign matter from the chamber getting into a compressor.

These and other objects of the invention will become apparent from the following description, read in conjunction with the accompanying drawing, in which the figure shows in longitudinal cross-section a preferred form of apparatus provided in accordance with the invention.

The apparatus comprises a body 2 forming a chamber which is adapted to be connected to the output of a compressor through connections to a threaded opening 4. In the particular use described, this assembly is associated with a ponton rather than with the compressor, and the connection between threads 4 and the compressor preferably involves a coupling of conventional quick connecting type. The body 2 is provided with a threaded bore 6 arranged to receive the threads on a valve stem 10 packed as indicated at 8 and provided with a handle 12. A bridge member 14 within the chamber in the body 2 contains a packing ring 16 bearing upon an enlarged portion 18 of the stem, which is bored as indicated at 20 and provided with a plurality of openings 22 communicating with the space to the left of the packing 16 when the stem is in the position illustrated. The bore 20 of the stem communicates with a nozzle 24 which opens into the mixing chamber 26 of an ejector assembly provided with an exhaust passage indicated at 28. The mixing chamber 26 communicates with a chamber 30 into which there open a series of nipples 32 to which hose connections may be made with the various chambers of a ponton. These nipples 32 may be provided in any suitable number in an annular arrangement about the tube 28. Generally, four or more are desirably provided, since a single compressor can take care of the filling and discharge of a number of ponton chambers.

A seat 36 surrounds an opening 37 furnishing communication between the chamber within the body 2 and the chamber indicated at 30 and is engageable by a flange 34 on the stem 18 arranged to act as a valve. A second flange 38 on the stem is arranged to seat at 40 to cut off communication between the chamber 30 and the mixing chamber 36.

In the operation of this apparatus, the stem 10 is initially moved to the right by turning the handle 12 so that the flange 38 seats at 40 and an opening is provided between seat 36 and flange 34, so that free communication between chambers 2 and 30 is provided. At this time, the openings 22 will pass within the packing ring 16, so that communication between the chamber 2 and the bore 20 is cut off.

If connections are now made between the pontons and the nipples 32, and compressed air is delivered into the chamber 2, from the compressor, it will be evident that the air will pass through the nipples to the ponton chambers to produce rapid inflation. Check valves will, of course, be provided in the connections either throughout the inflating operation or by insertion at the end thereof, since, generally speaking, the inflation may be carried out far more rapidly with the check valves absent, and there will be substantially no loss of air involved if the connections are broken and the check valves rapidly inserted. In fact, in such cases, after the check valves are inserted, a further operation of the pump may be used to replace any air which may leak out during the manipulation. Following the completion of the inflation, the assembly illustrated may be disconnected from the pump, remaining if desired connected continuously to the ponton through hose connections.

When it is desired to deflate the ponton, the apparatus is again connected to the outlet of the compressor (or it may remain connected in the event that the compressor is carried by the ponton which it is designed to inflate and deflate). The valve stem 10 is then moved to the left to the position illustrated, in which the flange 34 seats at 36 and the openings 22 are clear of the packing 16 so as to furnish free communication between the chamber 2 and the bore 20. When the compressor is then operated, the check valves having been removed from the hose connections to the ponton (or opened for reverse flow, depending upon their construction), a high velocity jet of air emerging from the nozzle 34 will produce an ejector effect in the mixing chamber 26, drawing a partial vacuum in the chamber 30, and hence serving to effect the rapid exhaustion of air from the ponton, which will now be subject to a difference of pressure equal to that between atmospheric pressure and the reduced pressure in the chamber 30 in addition to the pressure created by the normal tendency of the ponton to collapse. In this fashion, in a matter of time not greatly exceeding the inflation time, the ponton may be completely exhausted with removal of air from all portions of its chambers so that the ponton is reduced to a completely flat condition and may be readily rolled up into a compact unit. It will be evident that this deflating action occurs without any possibility of entrance of water or dirt into the compressor, any such materials withdrawn from the ponton being forced out of the tubular passage 28 through the ejector jet action.

It will be evident that various modifications of the invention may be made within the scope of the appended claim.

What I claim and desire to protect by Letters Patent is:

A device of the type described comprising a chamber, means providing a passage through which said chamber may be supplied with compressed gas, a second chamber, means providing at least one passage through which flow may occur to and from said second chamber, a longitudinally movable member providing an ejector nozzle, means providing a connection between the first chamber and the ejector nozzle, means providing an ejector passage extending in the direction of movement of said member and communicating with said second chamber and into which said nozzle projects, a passage between said first two chambers, and valve means associated with said movable member arranged so that, in one position thereof, communication between the first chamber and the nozzle and between the second chamber and the ejector passage is cut off, and free communication is opened between the first and second chambers, and, in another position thereof, communication between the first and second chambers is interrupted and free communication is opened between the first chamber and the nozzle and between the second chamber and the ejector passage, so that in said two positions the second chamber may be supplied with gas under pressure and be subjected to suction, respectively.

ALFRED N. GUSTAFSON.